US012646156B2

(12) United States Patent
Choudhury et al.

(10) Patent No.: US 12,646,156 B2
(45) Date of Patent: Jun. 2, 2026

(54) NEURAL NETWORKS FOR PRECISION RENDERING IN DISPLAY MANAGEMENT

(71) Applicant: Dolby Laboratories Licensing Corporation, San Francisco, CA (US)

(72) Inventors: Anustup Kumar Atanu Choudhury, Campbell, CA (US); Robin Atkins, Vancouver (CA)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 223 days.

(21) Appl. No.: 18/685,861

(22) PCT Filed: Aug. 23, 2022

(86) PCT No.: PCT/US2022/041199
§ 371 (c)(1),
(2) Date: Feb. 22, 2024

(87) PCT Pub. No.: WO2023/028046
PCT Pub. Date: Mar. 2, 2023

(65) Prior Publication Data
US 2024/0354914 A1 Oct. 24, 2024

Related U.S. Application Data

(60) Provisional application No. 63/236,476, filed on Aug. 24, 2021.

(30) Foreign Application Priority Data

Nov. 4, 2021 (EP) ...................................... 21206398

(51) Int. Cl.
*G06T 5/90* (2024.01)
*G06T 5/60* (2024.01)

(52) U.S. Cl.
CPC .................. *G06T 5/90* (2024.01); *G06T 5/60* (2024.01); *G06T 2207/10016* (2013.01); *G06T 2207/10024* (2013.01); *G06T 2207/20016* (2013.01)

(58) Field of Classification Search
CPC ... G06T 5/90; G06T 5/60; G06T 2207/10016; G06T 2207/10024; G06T 2207/20016; G06T 2207/20028; G06T 2207/20084
See application file for complete search history.

(56) References Cited

U.S. PATENT DOCUMENTS 8,593,480 B1 11/2013 Ballestad
9,679,360 B2 * 6/2017 Fleischer .................. G01J 9/00
(Continued)

FOREIGN PATENT DOCUMENTS

JP       2021111140 A    8/2021
WO      2020219341 A1   10/2020
WO      2023009392 A1    2/2023

OTHER PUBLICATIONS

Guo Cheng et al.: "Deep Tone-Mapping Operator Using Image Quality Assessment Inspired Semi-Supervised Learning", IEEE Access, IEEE, USA, vol. 9, May 14, 2021 (May 14, 2021), pp. 73873-73889, 17 pages.

(Continued)

*Primary Examiner* — Santiago Garcia

(57) ABSTRACT

Methods and systems for precision rendering in display mapping using neural networks are described. Given an intensity input image, a sequence of neural networks comprising a pyramid-halving sub-network, a pyramid down-sampling sub-network, a pyramid-up-sampling sub-network, and a final-layer generation sub-network generate a base layer image and a detail layer image to be used in display mapping.

12 Claims, 7 Drawing Sheets

(56) References Cited

U.S. PATENT DOCUMENTS

| | | | | |
|---|---|---|---|---|
| 9,961,237 | B2 | 5/2018 | Atkins | |
| 10,043,113 | B1 * | 8/2018 | Kim | G06T 7/10 |
| 10,600,166 | B2 | 3/2020 | Pytlarz | |
| 11,803,948 | B2 | 10/2023 | Atkins | |
| 12,020,482 | B2 * | 6/2024 | Zong | G06V 20/46 |
| 2008/0205508 | A1 * | 8/2008 | Ziauddin | H04N 19/577 |
| | | | | 375/E7.262 |
| 2012/0294367 | A1 * | 11/2012 | Ziauddin | H04N 19/61 |
| | | | | 375/E7.125 |
| 2013/0328878 | A1 * | 12/2013 | Stahl | G09G 5/005 |
| | | | | 345/1.3 |
| 2017/0178353 | A1 * | 6/2017 | Smirnov | H04N 13/271 |
| 2019/0304068 | A1 * | 10/2019 | Vogels | G06T 5/70 |
| 2020/0272825 | A1 * | 8/2020 | Zhang | G06N 3/08 |
| 2022/0156899 | A1 * | 5/2022 | Abdelhamed | H04N 23/85 |
| 2022/0245832 | A1 * | 8/2022 | Gupte | G06T 7/246 |
| 2022/0277421 | A1 * | 9/2022 | Xiao | G06T 3/4053 |
| 2022/0335572 | A1 * | 10/2022 | Seresht | G06N 3/0464 |
| 2023/0140100 | A1 * | 5/2023 | Potapov | G06T 3/4069 |
| | | | | 345/428 |
| 2024/0096042 | A1 * | 3/2024 | Ikizyan | G06T 19/20 |

OTHER PUBLICATIONS

ITU-R Rec. BT 2100, Jul. 2016, pp. 1-17, 17 pages.

* cited by examiner

NEURAL NETWORKS FOR PRECISION RENDERING IN DISPLAY MANAGEMENT

CROSS-REFERENCE TO RELATED APPLICATIONS

This application is a National Phase entry of PCT Patent Application No. PCT US2022/041199, having international filing date of Aug. 23, 2022, which claims the benefit of priority from U.S. Provisional patent application No. 63/236,476, filed on 24 Aug. 2021 and EP patent application Ser. No. 21/206,398.6, filed on 4 Nov. 2021, each one incorporated by reference in its entirety.

TECHNOLOGY

The present invention relates generally to images. More particularly, an embodiment of the present invention relates to precision rendering in display management.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). For example, using gamma luminance coding, images where $n \leq 8$ (e.g., color 24-bit JPEG images) are considered images of standard dynamic range, while images where $n \geq 10$ may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, minimum, average, and maximum luminance values in an image, color space or gamut information, reference display parameters, and auxiliary signal parameters, as those described herein.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "display management" refers to processes that are performed on a receiver to render a picture for a target display. For example, and without limitation, such processes may include tone-mapping, gamut-mapping, color management, frame-rate conversion, and the like.

As used herein, the term "precision rendering" denotes a down-sampling and up-sampling/filtering process that is used to split an input image into two layers: a filtered base layer image and a detail layer image (Ref. [2]). By applying a tone-mapping curve to the filtered base layer, and then adding back the detail layer to the result, in tone—or display-mapping, the original contrast of the image can be preserved both globally as well as locally. This may be also be referred to as "detail preservation" or "local tone-mapping." A more detailed description of precision rendering is provided later.

The creation and play back of high dynamic range (HDR) content is now becoming widespread as HDR technology offers more realistic and lifelike images than earlier formats. In parallel, IC manufacturers have started incorporating hardware accelerators for neural networks (NNs). To improve existing display schemes, while taking advantage of such neural-network accelerators, as appreciated by the inventors here, improved techniques for precision rendering and display management using neural networks are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods and systems for precision rendering in display management using neural networks are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to methods for precision rendering in display management using neural-network architectures. In an embodiment, a neural network system receives an input image in a first dynamic range and a first spatial resolution. Next, the system:

generates an input intensity image (I) based on the input image;
  generates a second intensity image using a pyramid-halving network by subsampling the input intensity image until it is lower or equal than a second spatial resolution;
  generates a set of down-sampled images based on the second intensity image and a pyramid down-sampling neural network;
  generates two up-sampled images at the second spatial resolution based on the set of down-sampled images and a pyramid up-sampling neural network comprising edge-aware up-sampling filtering; and
  generates an output base layer (BL) image in the first spatial resolution by combining in a final-layer neural network the two up-sampled images and the input intensity image.

Neural Networks for Precision Rendering in
Display Management

Video Coding Pipeline

Figure 1:
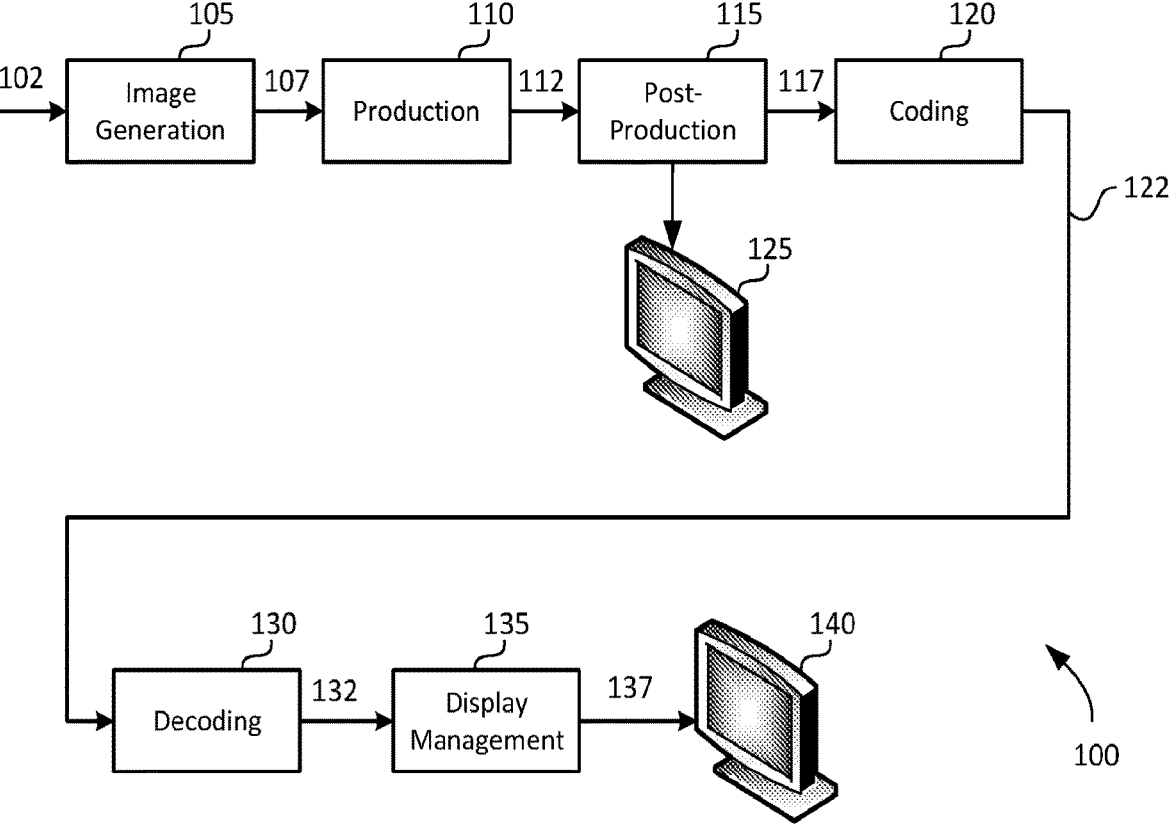
FIG. 1 depicts an example process for a video delivery pipeline.

FIG. 1 depicts an example process of a conventional video delivery pipeline (100) showing various stages from video capture to video content display. A sequence of video frames (102) is captured or generated using image generation block (105). Video frames (102) may be digitally captured (e.g., by a digital camera) or generated by a computer (e.g., using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Without limitations, examples of display management processes are described in Refs. [1] and [2].

Global Versus Local Tone-Mapping Techniques

In traditional global display mapping, the mapping algorithm applies a single sigmoid-like function (for examples, see Refs [3] and [4]) to map the input dynamic range to the dynamic range of the target display. Such mapping functions may be represented as piece-wise linear or non-linear polynomials characterized by anchor points, pivots, and other polynomial parameters generated using characteristics of the input source and the target display. For example, in Refs. [3-4] the mapping functions use anchor points based on luminance characteristics (e.g., the minimum, medium (average), and maximum luminance) of the input images and the display. However, other mapping functions may use different statistical data, such as the variance or standard deviation of luminance values at a block level, a picture slice, or for the whole image.

As described in more detail in Ref. [2], the display mapping process (135) may be further improved by taking into consideration local contrast and details information of the input image. For example, as described later, a down-sampling and up-sampling/filtering process may be used to split the input image into two layers: a filtered base layer image and a detail layer image. By applying a tone-mapping curve to the filtered base layer, and then adding back the detail layer to the result, the original contrast of the image can be preserved both globally as well as locally. This may also be referred to as "detail preservation" or as "precision rendering."

Thus, display-mapping can be performed as a multi-stage operation:

a) Generate a base layer (BL) image to guide the SDR (or HDR) to HDR mapping;
  b) Perform the tone-mapping to the base layer image;
  c) Add the detail layer image to the tone-mapped base layer image.

In Ref. [2], the generated base layer (BL) represents a spatially-blurred, edge-preserved, version of the original image. That is, it maintains important edges but blurs finer details. More specifically, generating the BL image may include:

Using the intensity of the original image, creating an image pyramid with layers of lower resolutions, and saving each layer.

Starting with the layer of the lowest resolution, up-sampling to higher layers to generate the base layer. An example of generating a base layer and a detail layer image may be found later in this specification.

Neural-Networks Architectures

Figure 2:
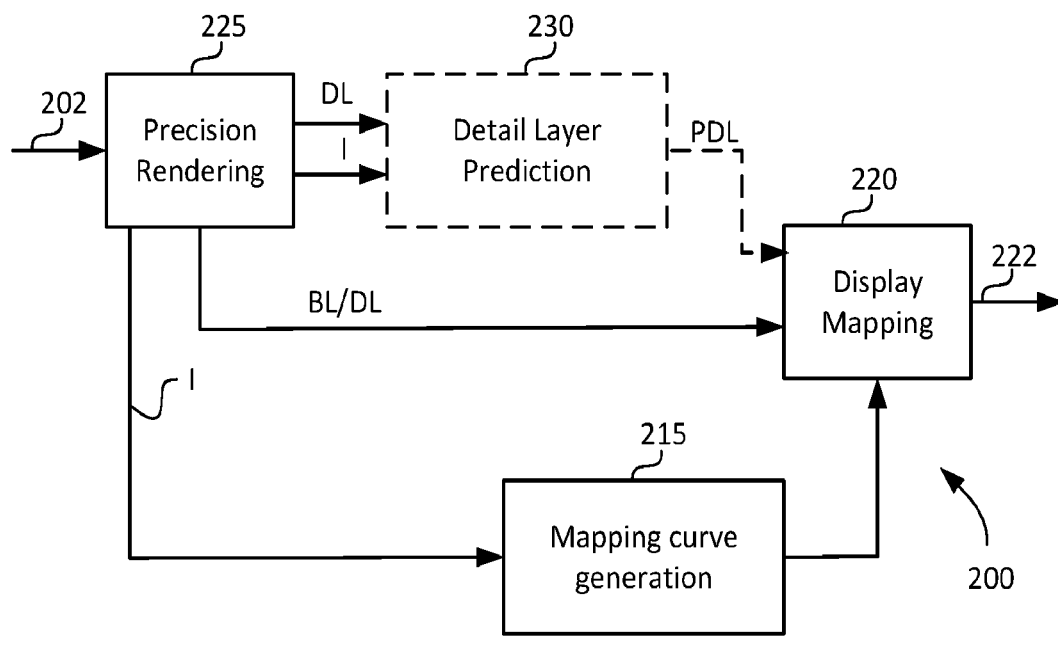
FIG. 2 depicts an example process of display management using precision rendering according to an embodiment of the present invention.

FIG. 2 depicts an example process (200) of display management using precision rendering (225). As depicted in FIG. 2, input video (202) may include video received from a video decoder and/or video received from a graphical processing unit (say, from a set-top box), and/or other video inputs (say, from a camera, an HDMI port in the TV or the set-top box, a graphical processing unit (GPU), and the like). Input video 202 may be characterized as "SDR" or "HDR" video to be displayed on a HDR or SDR display after appropriate dynamic range conversion.

In an embodiment, process 200 includes a mapping curve generation unit (215) to generate a tone-mapping curve based on the characteristics of the intensity (I) of the input signal. Examples of such processes can be found in references [1-5]. The output of the mapping curve generation unit, together with the output of the precision rendering block (225) and an optional detail-layer prediction unit (230) is fed to the display mapping unit (220), to generate the mapped output 222.

To extract the intensity, input RGB images may be converted to a luma-chroma color format, such as YCbCr, ICtCp, and the like, using known in the art color-transformation techniques, such as ITU-R Rec. BT 2100 and the like. In an alternative embodiment, intensity may be characterized as the per-pixel maximum value of its R, G, and B components. The intensity extraction step may be bypassed if the source image is already represented as a single-channel intensity image. In some embodiment, pixel values may also be normalized to [0.1] according to a predefined standard dynamic range, e.g., between 0.005 and 100 nits, to facilitate the computation of the image statistics.

As depicted in FIG. 2, process 200 includes precision rendering block (225), which, given the intensity (I) of the original image, it generates a base layer ($I_{BL}$) (BL) image and a detail layer image ($I_{DL}$) (DL). In an embodiment, pixels at location (x, y) of the detail layer image are generated as $$I_{DL}(x, y) = I(x, y) - I_{BL}(x, y) * dg,$$  (1)

where dg denotes a detail-gain scaler in [0, 1].

The detail layer prediction block (230) takes as input two channels: the detail layer (DL) of the input image and the intensity (I) channel of the source image. It generates a single channel predicted detail layer (PDL) image, with the same resolution as the detail layer image, containing residual values to be added to the detail layer image. In an embodiment, the detail layer residuals stretch the local contrast of the output image to increase its perceived contrast and dynamic range. By utilizing both the detail layer input and the input image, as discussed in Ref. [5], a neural-network implementation of block 230 can predict contrast stretching based not only on the contents of the detail layer but also based on the content of the source image. In a way, this gives the neural network (NN) the possibility to correct for any problems the fixed precision rendering decomposition into base and detail images may have.

In some embodiments, one can use the base layer $I_{BL}$ directly, or in combination with the input intensity image I, as in $$I_B = \alpha * I_{BL} + (1 - \alpha) * I,$$

where $\alpha$ is a scaler in [0, 1]. When $\alpha=0$, the tone-mapping is equivalent to a traditional global tone-mapping. When $\alpha=1$, tone mapping is performed only on the base layer image.

Given $I_{DL}$, an optional scaler $\beta$ in [0, 1] on image $I_{DL}$ may be used to adjust the sharpening of the tone-mapped output to the generate final tone-mapped image $$I' = I'_{BL} + I_{DL} * \beta,$$  (2)

where $I'_{BL}$ denotes a tone-mapped version of $I_{BL}$ (or $I_B$). When detail layer prediction 230 is being used, then $$I' = I'_{BL} + (I_{DL} + PDL) * \beta.$$  (3)

In an alternative implementation, process 200 may be simplified by bypassing (removing) the detail layer prediction (230) and by using only the original detail layer (DL). Thus, given a pyramid representation of the input image, process 200 may be adjusted as follows:

In block 225, split the intensity of the input image into a base layer and a detail layer Generate a mapping curve in block 215

Use the mapping curve to generate an optimized mapping of only the base layer (BL) of the input image Add the original detail layer (DL) to the optimized mapping to generate the final image (e.g., see equation (2)).

Figure 3:
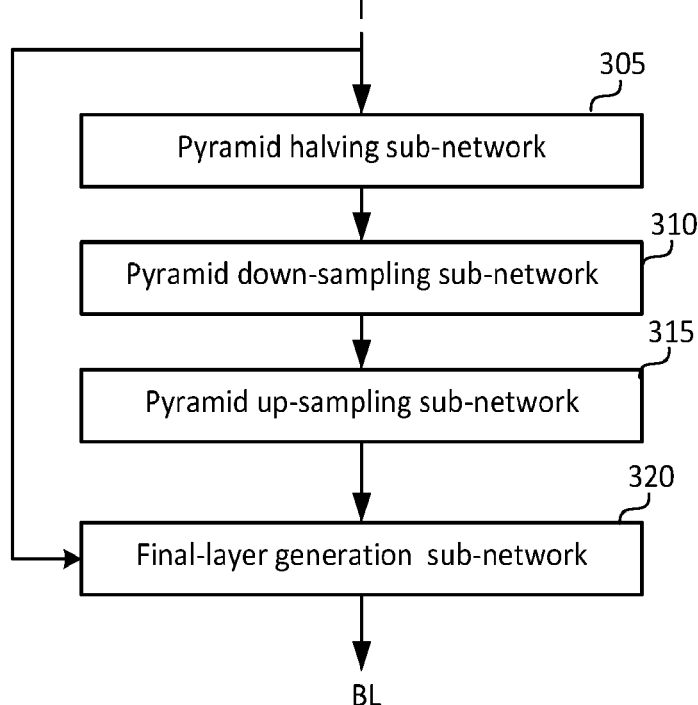
FIG. 3 depicts an example of the precision rendering pipeline according to an embodiment of the present invention.

FIG. 3 depicts an example of the precision rendering pipeline according to an embodiment. As depicted in FIG. 3, the precision rendering network (PRN) may be divided into four consecutive sub-networks:

a pyramid halving sub-network (305)

a pyramid down-sampling sub-network (310)

a pyramid up-sampling sub-network (315); and a final-layer generation sub-network The output of each of those sub-networks forms the input to the subsequent one.

Given the sequential nature of the precision-rendering process, embodiments may select to apply a neural-network only to selected steps and apply conventional processing to the remaining steps. In other embodiments, two or more consecutive sub-networks may be combined to a larger sub-network. In an embodiment, all four subnetworks can also be combined into a single neural network. It is expected that a division of neural-network processing vs conventional processing will depend heavily on the availability of hardware accelerators for neural-network processing.

In an embodiment, the pyramid halving sub-network 305 can be considered a pre-processing step to accommodate the resolution constraints of the rest of the network. For example, if the rest of the network (e.g., steps 310, 315) can only handle images with a maximum of 1024×576 resolution, this step may be called iteratively until either the width of the output image is below 1024 or the height of the image is below 576. The network may also be used to replicate/pad border pixels so all possible inputs comply with the resolution requirements of the sub-networks.

For example, with a 4K-resolution input image, the first layer (say, at 2K resolution), could be skipped. Then, during up-sampling (e.g., in step 320), the quarter-resolution image would simply be doubled twice. Similarly, for an 8K-resolution input image, both the half and quarter resolution layers may be skipped. This ensures that no matter the input image size, the subsequent layers of the pyramid will have the same dimensions.

In the rest of this specification, convolution networks are defined by their size in pixels (M×N), how many image channels (C) they operate on, and how many such kernels are in the filter bank (K). In that sense, each convolution can be described by the size of the filter bank M×N×C×K (where M×N denotes width×height). As an example, a filter bank of the size 3×3×1×2 is composed of 2 convolution kernels, each of which operates on one channel and has a size of 3 pixels by 3 pixels. In case a convolution network incorporates a bias, then it will be denoted with Bias (B)=True, otherwise, with B=False.

Some filter banks may also have a stride, meaning that some results of the convolution are discarded. A stride(S) of 1 means every input pixel produces an output pixel. A stride of 2 means that only every second pixel in each dimension produces an output, and the like. Thus, a filter bank with a stride of 2 will produce an output with (M/2)×(N/2) pixels, where M×N is the input image size. All inputs except the ones to fully connected kernels are padded so that setting the stride of 1 would produce an output with the same number of pixels as the input. The output of each convolution bank feeds as an input into the next convolution layer.

In an embodiment, the pyramid-halving network (305) has a padding unit (denoted as "Pad" in FIGS. 4 and 5) followed by a single convolution operation with bias B=False, and a stride of 2, that essentially down-samples the image. Thus, it can be expressed as a 2×2×1×1 convolution network with stride S=2. For example, given a 1920×1080 input, its output will be 960×540. The padding unit simply adds rows and columns to the input image so an input to the convolution network with non-conforming resolution is converted to match a desired resolution (e.g., 1024×576) regardless of the resolution of the input I.

The pyramid down-sampling sub-network (310) generates a pyramid representation of the input, to be used later on for improved tone mapping. For example, given a full-high-definition input, in an embodiment, the pyramid may generate the following layers: 1024×576, 512×288, 256×144, 128×72, 64×36, 32×18, and 16×9.

While the pyramid is described in terms of sub-sampling using sub-sampling factors of 2, other sub-sampling factors may be used without loss of generality. Since this is used for down-sampling, a stride of 2 is used for each convolution filter. Before computing the first level of the pyramid (e.g., at 1024×576), the input image may be padded by replicating border pixels, taking into account input images of various sizes or aspect ratios.

Figure 4:
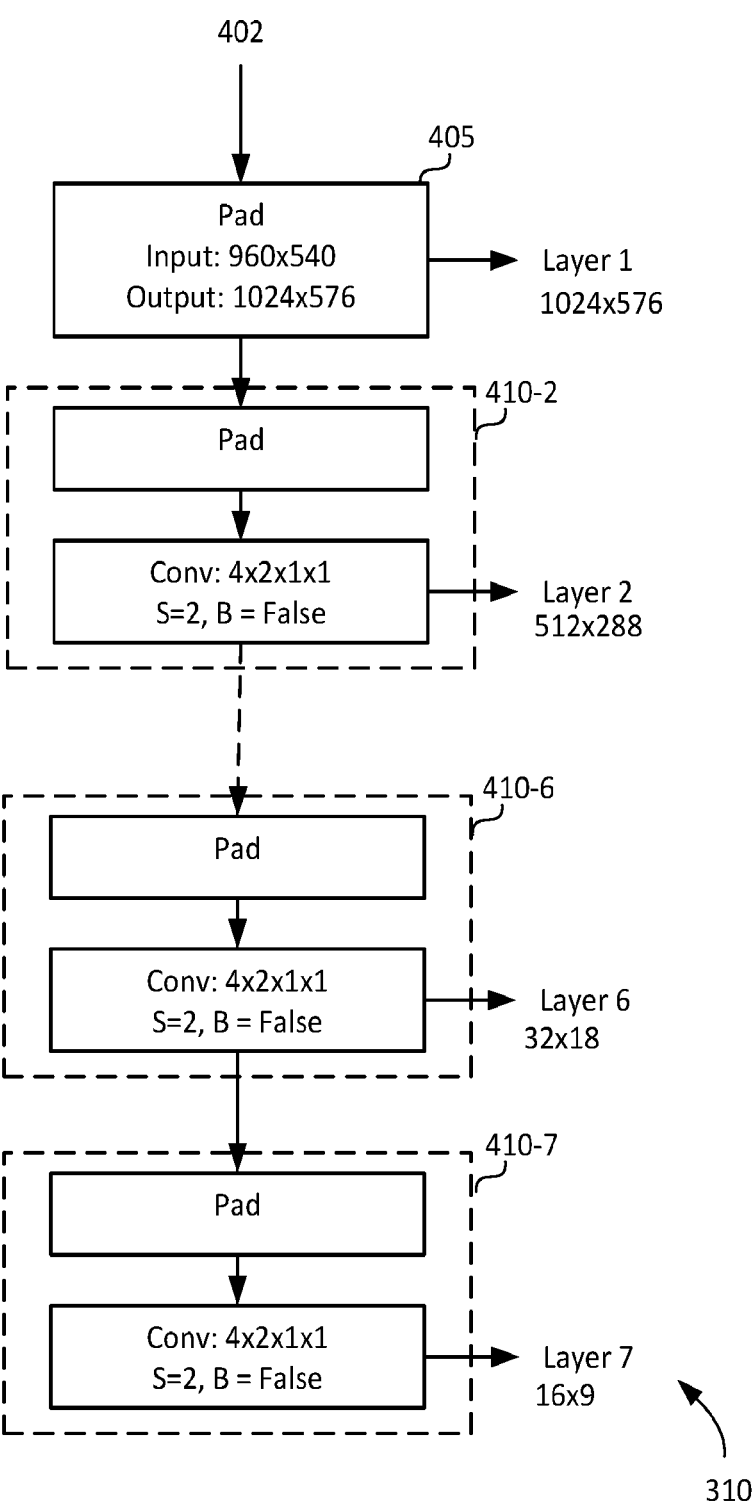
FIG. 4 depicts an example neural network for a pyramid down-sampling sub-network according to an embodiment of the present invention.

Before computing the first level of the pyramid (e.g., at 1024×576), the input image may be padded to:

guarantee that all spatial dimensions are divisible by two, from the smallest to the largest pyramid levels replicate border pixels, taking into account a specified region of interest (ROI)

replicate border pixels, taking into account input images of various sizes or aspect ratios FIG. 4 depicts an example neural-network for the pyramid down-sampling sub-network (310). In an embodiment sub-network 310 comprises a padding network 405, followed by six consecutive convolution neural network blocks (e.g., 410-2, 410-6, 410-7), each 4×2×1×1, with B=False, and S=2. Thus, given a 960×540 input 402, starting at 1024×576 (layer 1), the network generates additional outputs at: 512×288 (layer 2), 256×144 (layer 3), 128×72 (layer 4), 64×36 (layer 5), 32×18 (layer 6), and 16×9 (layer 7). Accordingly, the pyramid down-sampling sub-network/neural network 310 may generate a set of images forming an N-level (e.g. N=7) image pyramid representation of the input 402. The pyramid down-sampling sub-network 310 may comprise two or more consecutive convolutional blocks, wherein each convolutional block may generate a down-sampled image of a respective layer of the pyramid representation. Denoting the down-sampled image of the i-th pyramid layer P(i), the down-sampled image P(i) may, for i=2, . . . , N, have a lower spatial resolution than the down-sampled image of the i−1-th pyramid layer P(i−1).

Figure 5A:
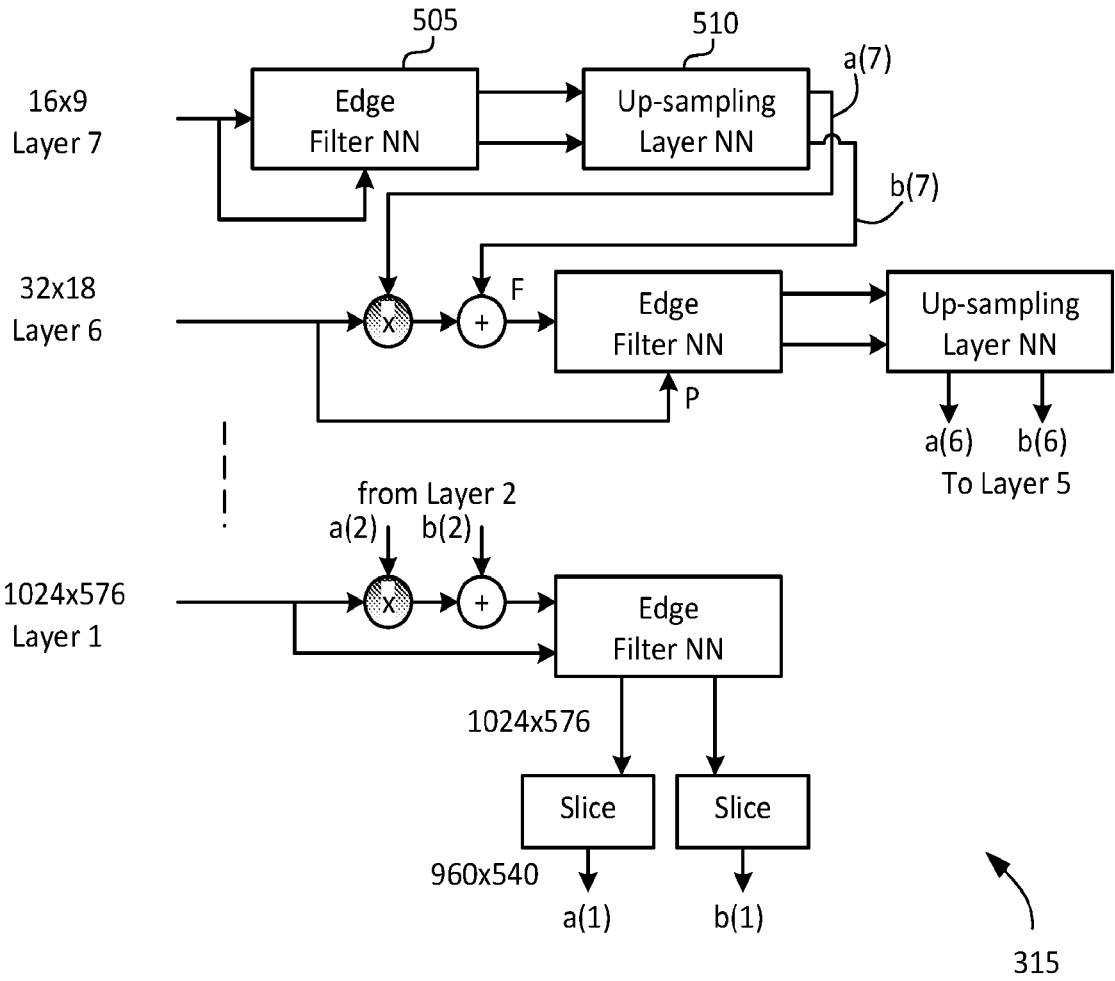
FIG. 5A depicts an example neural network for the pyramid up-sampling sub-network according to an embodiment of the present invention.

FIG. 5A depicts an example neural-network for the pyramid up-sampling sub-network (315). This network receives the down-sampled pyramid data from the pyramid down-sampling sub-network (310) and reconstructs the original image in its original resolution using, at each layer, an edge-aware up-sampling filter. The smallest resolution-level of the pyramid (e.g., 16×9) is up-sampled first, then, additional levels are processed and up-sampled, up to the resolution of the pyramid level with the highest resolution (e.g., 1024×576).

Denote as P(i) the pyramid image at layer i. Starting at the lowest resolution level (e.g., i=7), the lowest resolution pyramid image (e.g., P(7)) is fed to an edge-preserving filter (505) which generates two coefficient "images" to be denoted as al(7) and bl(7) (defined below). Next, both al(7) and bl(7) are up-sampled by a factor of two using an up-sampling layer NN (510) to generate up-sampled coefficient images a(7) and b(7).

At the next layer, i=6, the P(6) layer of the pyramid is combined with the up-sampled coefficient images a(7) and b(7) to generate image $$F(6) = a(7) * P(6) + b(7), \qquad (4)$$

which together with image P(6) are fed to the edge-up sample filter to generate the coefficient "images" al(6) and bl(6). Next, al(6) and bl(6) are up-sampled by a factor of two to generate up-sampled coefficient images a(6) and b(6). The same process continues for the other pyramid layers. In general, for i=7, 6, 5, . . . , 2, $$F(i - 1) = a(i) * P(i - 1) + b(i), \qquad (5)$$

where the operation "*" of multiplying a coefficient image with an image corresponds to multiplying pixel by pixel their corresponding pixels. For example, at pixel location (m,n), for a pyramid level i with dimensions W(i)×H(i), $$F(i-1)_{m,n} = a(i)_{m,n} * P(i-1)_{m,n} + b(i)_{m,n}, \qquad (6)$$

for m=1, 2, . . . , W(i−1) and n=1, 2, . . . , H(i−1).

As depicted in FIG. 5A, at Layer 7, P(7)=F(7), and at Layer 1 there is no need to apply the up-sampling filter (510). Furthermore, at Layer 1, two "Slice" blocks, given the 1024×576 outputs of the edge filter, crop them at 960×540.

Figure 5B:
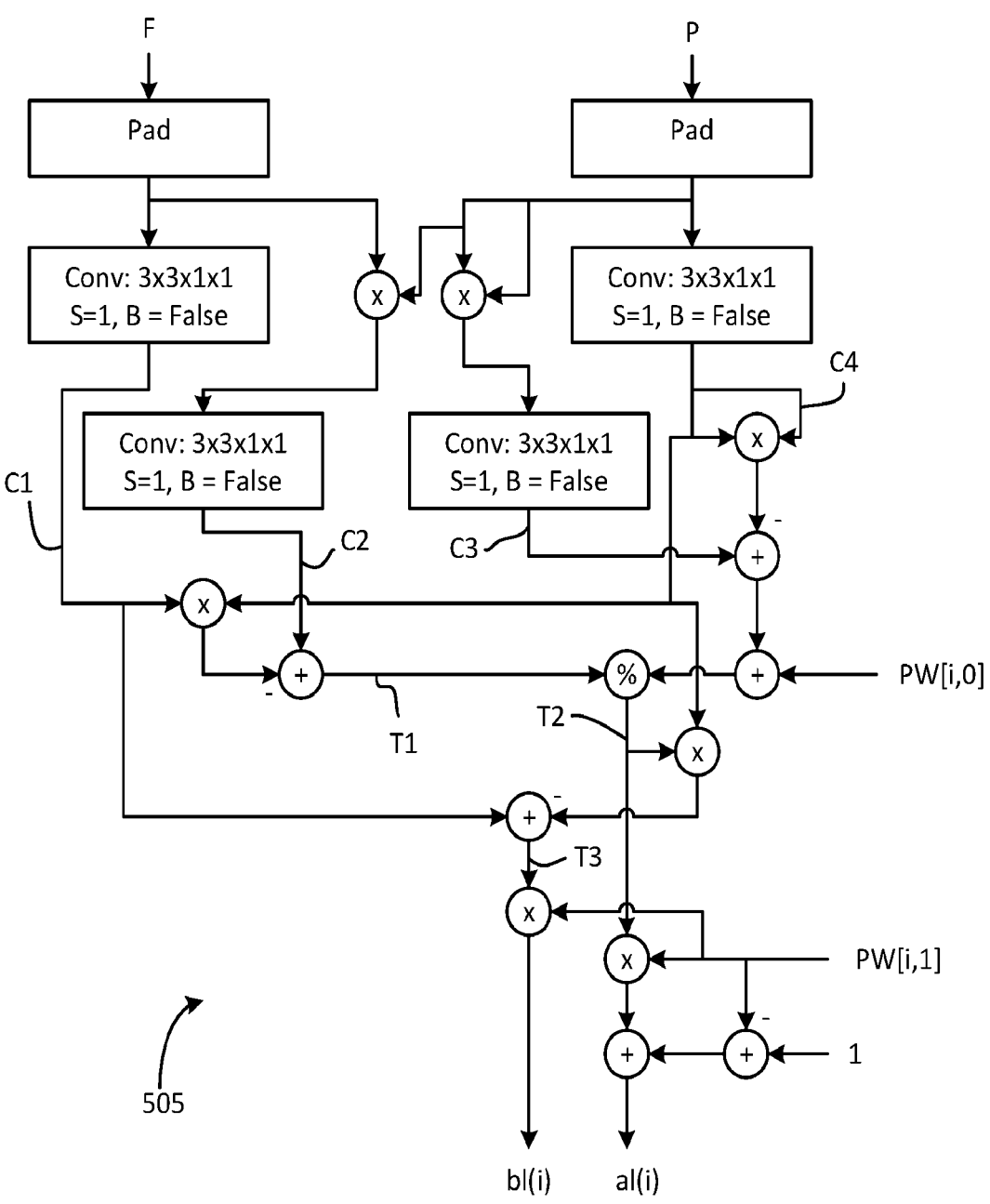
FIG. 5B depicts an example neural network for an edge filter being used in the pyramid up-sampling sub-network according to an embodiment of the present invention.

FIG. 5B depicts an example neural network for the edge filter (505) being used in the pyramid up-sampling sub-network according to an embodiment. Given two inputs (F,P), the edge filter will generate the corresponding al(i) and bl(i) values using a number of basic arithmetic-operations blocks (e.g., addition, multiplication, and division), and four 3×3×1×1, S=1, B=False, convolutional neural network blocks (to also be referred to as convolutional blocks), with outputs denoted as C1, C2, C3, and C4. Additional inputs to the edge filter include weights PW[i,0] and PW[i,1] with values in [0,1] (Ref. [2]).

C1 represents a local mean of F, C2 represents a local mean of (F*P), C3 represents a local mean of (P*P), and C4 represents a local mean of P. Thus, from FIG. 5B:

$$T1 = C2 - (C1 * C4), \qquad (7)$$
$$T2 = T1/((C3 - C4^2) + PW[i, 0]),$$
$$T3 = C1 - (T2 * C4),$$
$$bl(i) = T3 * PW[i, 1],$$

$$al(i) = (T2 * PW[i, 1]) + (1 - PW[i, 1]).$$

Figure 5C:
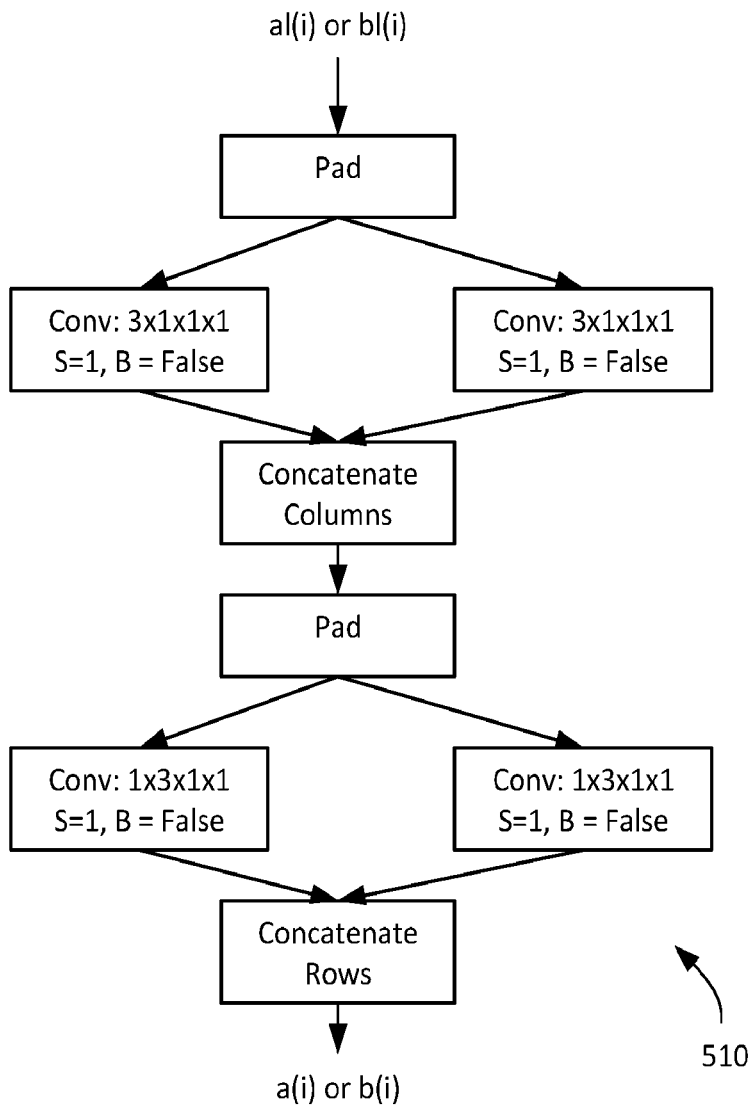
FIG. 5C depicts an example neural network for an up-sampling filter being used in the pyramid up-sampling sub-network according to an embodiment of the present invention.

FIG. 5C depicts an example neural network for the up-sampling filter (510) being used in the pyramid up-sampling sub-network according to an embodiment. Given an m×n input (e.g., al(i) or bl(i)) the filter will generate a 2m×2n output (e.g., a (i) or b(i)). The up-sampling filter includes two levels of processing, each level mimicking a traditional separable filter operating on rows (or columns) and columns (or rows). Level 1 of processing comprises one pad block and two 3×1×1×1, S=1, B=False, convolution blocks. Level 2 of processing comprises one pad block and two 1×3×1×1, S=1, B-False, convolution blocks. At each level, the outputs of the two convolution blocks are concatenated using a "Concatenate" block. For "Concatenate columns," if the inputs are both m×n, then the output will be m×2n. However, instead of just concatenating the two inputs, it will create the output by interleaving one column at a time from each input. Likewise, for the "Concatenate rows" block, since both inputs can be m×2n, it will interleave one row at a time from each input to generate a 2m×2n image.

Figure 6:
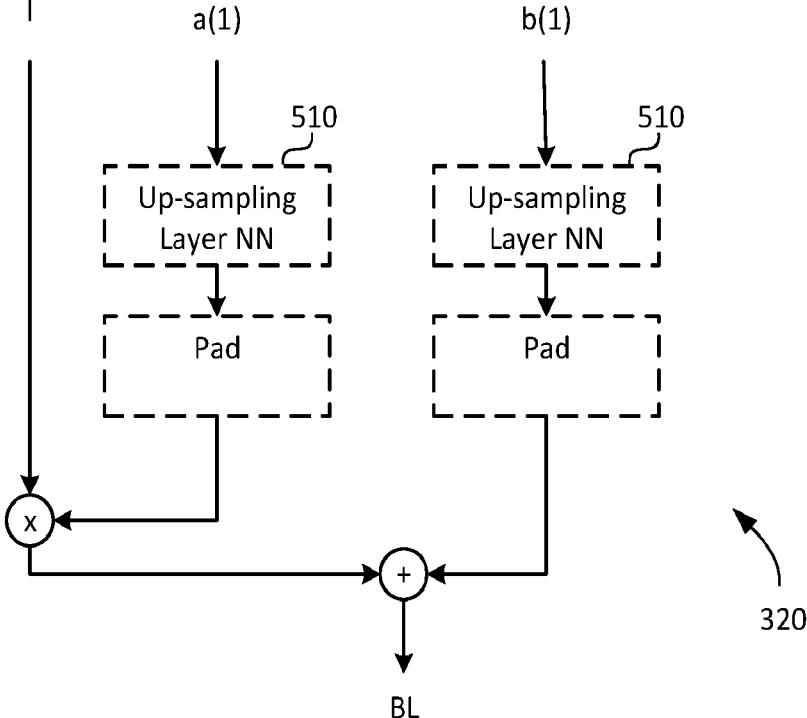
FIG. 6 depicts an example neural network for the final-layer generation sub-network according to an embodiment of the present invention.

FIG. 6 depicts an example neural network for the final-layer generation sub-network according to an embodiment of the present invention. This network takes as input the original intensity image (I) and the outputs a(1) and b(1)

from the pyramid up-sampling sub-network (315) to generate the output base layer (BL)

$$BL = I_{BL} = a(1) * I + b(1). \qquad (8)$$

As depicted in FIG. 6, this network may include optional Up-sampling and Pad blocks so that the BL resolution matches that of the input I. For example, if the resolution of a(1) and b(1) is 960×540, then the output of the up-sampling layer will be 1920×1080. If the resolution of/is 1920×1080, then, the Pad blocks will generate a 1920×1080 output as well. As discussed before, the up-sampling layer NN may be used multiple times to match the number of times the pyramid-halving network (305) was used.

In another embodiment, instead of applying the up-sampling network multiple times, one may apply specific NNs that up-sample the image directly by the appropriate factor (e.g., by 4, 8, and the like). For example, in an embodiment, NN 510 (see FIG. 5C) may be modified to upscale by a factor of 4 as follows:

- Replace the row of the two 3×1×1×1 convolutional blocks with a row of four 5×1×1×1 convolutional blocks, with all outputs provided as input to a concatenate columns network with four inputs and one output
- Use the concatenate columns network to generate an m×4n output by interleaving columns of its inputs as discussed earlier.
- Replace the row of two 1×3×1×1 convolutional blocks with a row of four 1×5×1×1 convolutional blocks, with all outputs provided as input to a concatenate rows network with four inputs and one output
- Use the concatenate rows network to generate a 4m×4n output by interleaving rows in its input as discussed earlier In an embodiment, the edge-filter weights may be derived outside of the NN implementation. However, the weights can also be derived from an offline training process using batches of images. The whole network can be trained on pairs of input images and corresponding base layer images. For example, a large collection of (HDR) images can be smoothened using the Analyzer block described in Ref. [2] or one may apply any edge-preserving smoothening process. Multiple mini-batches of such pairs can be iteratively given as input where the error difference between the reference and the predicted smoothened image is back-propagated through the network until the error converges or the performance reaches an acceptable state on the validation set. When the error converges, the corresponding weights for each of the convolution filter is stored for processing during run-time.

In traditional image processing, the filter weights would be chosen to achieve local optimum results which need not necessarily translate to the global optimum, since there are different components. The neural network architecture has the visibility over the entire network and it could choose the weights for each convolution block optimally for each sub-network.

REFERENCES

Each one of the references listed herein is incorporated by reference in its entirety.

1. U.S. Pat. No. 9,961,237, "Display management for high dynamic range video," by R. Atkins.

2. PCT Application PCT/US2020/028552, filed on 16 Apr. 2020, WIPO Publication WO/2020/219341, "Display management for high dynamic range images," by R. Atkins et al.

3. U.S. Pat. No. 8,593,480, "Method and apparatus for image data transformation," by A. Ballestad and A. Kostin, 4. U.S. Pat. No. 10,600,166, "Tone curve mapping for high dynamic range images," by J. A. Pytlarz and R. Atkins.

5. U.S. Provisional Patent Application Ser. No. 63/226,847, filed on Jul. 29, 2021, "Neural networks for dynamic range conversion and display management." by R. Wanat et al., also filed as PCT/US2022/037991, filed on Jul. 22, 2022.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations, such as those described herein. The computer and/or IC may compute any of a variety of parameters or values that relate to precision rendering in display mapping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to precision rendering in display mapping as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to precision rendering in display mapping are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of the present invention.

EEE 1. A method for precision rendering in display mapping, the method comprising:
accessing an input image in a first dynamic range and a first spatial resolution;
generating an input intensity image (I) based on the input image;
generating a second intensity image by subsampling the input intensity image until it is lower or equal than a second spatial resolution;
generating a set of down-sampled images based on the second intensity image and a pyramid down-sampling neural network;
generating two up-sampled images at the second spatial resolution based on the set of down-sampled images and a pyramid up-sampling neural network comprising edge-aware up-sampling filtering; and
generating an output base layer (BL) image in the first spatial resolution by combining in a final-layer neural network the two up-sampled images and the input intensity image.

EEE 2. The method of EEE 1, wherein generating the second intensity image comprises processing the input image by a pad block followed by a 2×2×1×1 convolutional block with Bias=false and Stride=1.

EEE 3. The method of EEE 1 or 2, wherein the set of down-sampled images are generated by the pyramid down-sampling neural network and form a pyramid representation of the second intensity image.

EEE 4. The method of EEE 3, wherein the pyramid down-sampling neural network comprises two or more consecutive convolutional blocks, wherein each convolutional block is configured to generate a down-sampled image of a respective layer of the pyramid representation.

EEE 5. The method of any one of EEEs 1-4, wherein the pyramid down-sampling neural network comprises two or more 4×2×1×1, with Bias=False, and Stride=2, consecutive convolutional blocks.

EEE 6. The method of any one of EEEs 1-5, wherein the pyramid up-sampling neural network comprises a plurality of processing layers, wherein given an input layer image P(i) with i-th spatial resolution, the i-th processing layer computes a(i) and b(i) values based on P(i), F(i), an edge-filter neural network, and an up-sampling filter neural network, wherein $$F(i-1) = a(i) * P(i-1) + b(i),$$

and wherein a(i) and b(i) have a spatial resolution higher than the spatial resolution of P(i−1).

EEE 7. The method of EEE 6, wherein the edge-filter neural network (of the i-th processing layer) comprises:
input images F and P;
input weights PW[i, 0] and PW[i, 1];
four 3×3×1×1 convolutional blocks with stride=1 and outputs C1, C2, C3, and C4, wherein C1 represents a local mean of F, C2 represents a local mean of (F*P), C3 represents a local mean of (P*P), and C4 represents a local mean of P; and
generates outputs al(i) and bl(i), wherein generating outputs al(i) and bl(i) comprises computing:

$$T1 = C2 - (C1 * C4),$$

$$T2 = T1/((C3 - C4^2) + PW[i, 0]),$$

$$T3 = C1 - (T2 * C4),$$

$$bl(i) = T3 * PW[i, 1],$$

$$al(i) = (T2 * PW[i, 1]) + (1 - PW[i, 1]).$$

EEE 8. The method of EEE 6 or 7, wherein the up-sampling filter neural network (of the i-th processing layer) comprises:
a filter input at an m×n spatial resolution;
a first layer of two 3×1×1×1 convolutional blocks, each processing the filter input and generating first and second filter outputs;
a column concatenator to interleave columns of the first and second filter outputs and generate a first-layer m×2n filter output;
a second layer of two 1×3×1×1 convolutional blocks, each processing the first-layer m×2n filter output and generating third and fourth filter outputs; and
a row concatenator to interleave rows of the third and fourth filter outputs and generate an up-sampling filter output at a 2m×2n spatial resolution.

EEE 9. The method of EEE 8, wherein given the filter input is al(i) the up-sampling filter output is a(i), and given the filter input is bl(i) the up-sampling filter output is b (i).

EEE 10. The method of any one of EEEs 1-9, wherein the final-layer neural network computes a base-layer (BL) image as $$BL = a(1) * I + b(1),$$

wherein, I denotes the input intensity image and a(1) and b(1) denote the two up-sampled images generated by the pyramid up-sampling sub-network.

EEE 11. The method of any one of EEEs 1-10, further comprising computing a detail-layer image (DL) as $$DL(x, y) = I(x, y) - BL(x, y) * dg,$$

wherein, for a pixel at location (x,y), I (x,y) denotes a pixel in the input intensity image, BL(x,y) denotes a corresponding pixel in the detail-layer image, and dg denotes a scaling variable in [0,1].

EEE 12. An apparatus comprising a processor and configured to perform any one of the methods recited in EEEs 1-11.

EEE 13. A non-transitory computer-readable storage medium having stored thereon computer-executable instruction for executing a method with one or more processors in accordance with any one of EEEs 1-11.

The invention claimed is:

1. A method for precision rendering in display mapping, the method comprising:
accessing an input image (202) in a first dynamic range and a first spatial resolution;
generating an input intensity image (I) based on the input image;
generating a second intensity image by subsampling the input intensity image until it is lower or equal than a second spatial resolution;
generating a set of down-sampled images based on the second intensity image and a pyramid down-sampling neural network;
generating two up-sampled images at the second spatial resolution based on the set of down-sampled images and a pyramid up-sampling neural network comprising edge-aware up-sampling filtering; and
generating an output base layer (BL) image in the first spatial resolution by combining in a final-layer neural network the two up-sampled images and the input intensity image.

2. The method of claim 1, wherein generating the second intensity image comprises processing the input image by a pad block followed by a 2×2×1×1 convolutional block with Bias=false and Stride=1.

3. The method of claim 1, wherein the set of down-sampled images are generated by the pyramid down-sampling neural network and form a pyramid representation of the second intensity image.

4. The method of claim 3, wherein the pyramid down-sampling neural network comprises two or more consecutive convolutional blocks, wherein each convolutional block is configured to generate a down-sampled image of a respective layer of the pyramid representation.

5. The method of claim 1, wherein the pyramid down-sampling neural network comprises two or more 4×2×1×1, with Bias=False, and Stride=2, consecutive convolutional blocks.

6. The method of claim 1, wherein the pyramid up-sampling neural network comprises a plurality of processing layers, wherein given an input layer image P(i) with i-th spatial resolution, the i-th processing layer computes a (i) and b(i) values based on P(i), F(i), an edge-filter neural network, and an up-sampling filter neural network, wherein $$F(i-1) = a(i-1) * P(i) + b(i-i),$$

and wherein a(i) and b(i) have a spatial resolution higher than the spatial resolution of P(i).

7. The method of claim 6, wherein the edge-filter neural network comprises:
input images F and P;
input weights PW[0] and PW[1];

four 3×3×1×1 convolutional blocks with stride=1 and outputs C1, C2, C3, and C4, wherein C1 represents a local mean of F, C2 represents a local mean of (F*P), C3 represents a local mean of (P*P), and C4 represents a local mean of P; and generates outputs al and bl, wherein generating outputs al and bl comprises computing:

$$T1 = C2 - (C1 * C4),$$

$$T2 = T1/((C3 - C4^2) + PW[0]),$$

$$T3 = C1 - (T2 * C4),$$

$$bl = T3 * PW[i, 1],$$

$$al = (T2 * PW[i, 1]) + (1 - PW[1]).$$

8. The method of claim 6, wherein the up-sampling filter neural network comprises:

a filter input at an m×n spatial resolution;

a first layer of two 3×1×1×1 convolutional blocks, each processing the filter input and generating first and second filter outputs;

a column concatenator to interleave columns of the first and second filter outputs and generate a first-layer m×2n filter output;

a second layer of two 1×3×1×1 convolutional blocks, each processing the first-layer m×2n filter output and generating third and fourth filter outputs; and a row concatenator to interleave rows of the third and fourth filter outputs and generate an up-sampling filter output at a 2m×2n spatial resolution, wherein given the filter input is al(i) the up-sampling filter output is a(i), and given the filter input is bl(i) the up-sampling filter output is b(i).

9. The method of claim 1, wherein the final-layer neural network computes a base-layer (BL) image as $$BL = a(1) * I + b(1),$$

wherein, I denotes the input intensity image and a(1) and b(1) denote the two up-sampled images generated by the pyramid up-sampling sub-network.

10. The method of claim 1, further comprising computing a detail-layer image (DL) as $$DL(x, y) = I(x, y) - BL(x, y) * dg,$$

wherein, for a pixel at location (x,y), I(x,y) denotes a pixel in the input intensity image, BL(x,y) denotes a corresponding pixel in the detail-layer image, and dg denotes a scaling variable in [0,1].

11. An apparatus comprising a processor and configured to perform the methods recited in claim 1.

12. A non-transitory computer-readable storage medium having stored thereon computer-executable instruction for executing a method with one or more processors in accordance with claim 1.

* * * * *